(12) United States Patent
Cho et al.

(10) Patent No.: US 11,652,248 B2
(45) Date of Patent: May 16, 2023

(54) BATTERY MODULE AND BATTERY PACK COMPRISING SAME BATTERY MODULE

(71) Applicant: LG Chem, Ltd., Seoul (KR)

(72) Inventors: Yong-Jin Cho, Daejeon (KR); Jun-Yeob Seong, Daejeon (KR)

(73) Assignee: LG Energy Solution, Ltd.

( * ) Notice: Subject to any disclaimer, the term of this patent is extended or adjusted under 35 U.S.C. 154(b) by 213 days.

(21) Appl. No.: 16/763,106

(22) PCT Filed: Jul. 26, 2019

(86) PCT No.: PCT/KR2019/009351
§ 371 (c)(1),
(2) Date: May 11, 2020

(87) PCT Pub. No.: WO2020/022844
PCT Pub. Date: Jan. 30, 2020

(65) Prior Publication Data
US 2020/0350644 A1    Nov. 5, 2020

(30) Foreign Application Priority Data

Jul. 27, 2018 (KR) .......................... 10-2018-0087971

(51) Int. Cl.
*H01M 10/02* (2006.01)
*H01M 10/653* (2014.01)
(Continued)

(52) U.S. Cl.
CPC ....... *H01M 10/653* (2015.04); *H01M 10/613* (2015.04); *H01M 10/625* (2015.04);
(Continued)

(58) Field of Classification Search
CPC ............. H01M 10/653; H01M 10/654; H01M 10/613; H01M 10/617; H01M 10/615;
(Continued)

(56) References Cited

U.S. PATENT DOCUMENTS

2016/0197386 A1* 7/2016 Moon ................. H01M 10/613
429/120
2016/0240893 A1  8/2016 Lee
(Continued)

FOREIGN PATENT DOCUMENTS

CN    109244294    *  1/2019  ............. H01M 2/10
EP    3264492 A1      1/2018
(Continued)

OTHER PUBLICATIONS

Translation of CN 109244294, Lu et al., A New-type Lithium Ion Battery Assembly Module, Jan. 18, 2019.*
(Continued)

*Primary Examiner* — Raymond Alejandro
(74) *Attorney, Agent, or Firm* — Lerner David LLP

(57) ABSTRACT

A battery module includes a plurality of battery cells stacked on each other, a heatsink configured to cool the plurality of battery cells, a module case having one side to which the heatsink is mounted, the module case being configured to accommodate the plurality of battery cells, and a thermal resin disposed inside the module case. The thermal resin is filled in the module case to cover at least a portion of electrode leads of the plurality of battery cells, and the thermal resin extends alongside the heatsink.

17 Claims, 8 Drawing Sheets

(51) Int. Cl.
*H01M 10/613* (2014.01)
*H01M 10/625* (2014.01)
*H01M 10/6551* (2014.01)
*H01M 10/6553* (2014.01)
*H01M 50/213* (2021.01)
*H01M 50/211* (2021.01)
*H01M 50/293* (2021.01)
*H01M 50/209* (2021.01)

(52) U.S. Cl.
CPC ... *H01M 10/6551* (2015.04); *H01M 10/6553* (2015.04); *H01M 50/209* (2021.01); *H01M 50/211* (2021.01); *H01M 50/213* (2021.01); *H01M 50/293* (2021.01); *H01M 2220/20* (2013.01)

(58) Field of Classification Search
CPC ............. H01M 10/62; H01M 10/625; H01M 10/6551; H01M 10/6553; H01M 10/6554; H01M 50/20; H01M 50/202; H01M 2220/20; H01M 2220/30
See application file for complete search history.

(56) References Cited

U.S. PATENT DOCUMENTS

| | | |
|---|---|---|
| 2016/0344073 A1 | 11/2016 | Hayashi et al. |
| 2017/0352933 A1 | 12/2017 | Choi et al. |
| 2018/0076493 A1 | 3/2018 | Park et al. |
| 2018/0183025 A1* | 6/2018 | Cao ................. H01M 50/24 |
| 2018/0205124 A1 | 7/2018 | Lee et al. |
| 2018/0366794 A1 | 12/2018 | Kim et al. |
| 2019/0044201 A1 | 2/2019 | Jo et al. |
| 2019/0115638 A1 | 4/2019 | Chen et al. |
| 2019/0131678 A1 | 5/2019 | Kim et al. |

FOREIGN PATENT DOCUMENTS

| | | | |
|---|---|---|---|
| EP | 3285311 | A1 | 2/2018 |
| JP | 2012174972 | A | 9/2012 |
| JP | 201337794 | A | 2/2013 |
| JP | 2013222603 | A | 10/2013 |
| JP | 2015228297 | A | 12/2015 |
| JP | 2016219260 | A | 12/2016 |
| KR | 20150025236 | A | 3/2015 |
| KR | 20160050828 | A | 5/2016 |
| KR | 20160066862 | A | 6/2016 |
| KR | 20160105360 | A | 9/2016 |
| KR | 20160138809 | A | 12/2016 |
| KR | 20170010667 | A | 2/2017 |
| KR | 20170107792 | A | 9/2017 |
| KR | 20170135473 | A | 12/2017 |
| KR | 20170138204 | A | 12/2017 |
| KR | 20180005456 | A | 1/2018 |
| KR | 20180047383 | A | 5/2018 |
| WO | 2017173412 | A1 | 10/2017 |
| WO | 2018070694 | A1 | 4/2018 |
| WO | 2018135757 | A1 | 7/2018 |

OTHER PUBLICATIONS

European Search Report for Application No. 19840656.3, dated May 7, 2021, 13 pages.
Partial Supplementary European Search Report including Written Opinion for Application No. EP19840656.3 dated Jan. 28, 2021.
International Search Report for Application No. PCT/KR2019/009351, dated Nov. 28, 2019, pp. 1-2.

* cited by examiner

BATTERY MODULE AND BATTERY PACK COMPRISING SAME BATTERY MODULE

CROSS-REFERENCE TO RELATED APPLICATIONS

The present application is a national phase entry under 35 U.S.C. § 371 of International Application No. PCT/KR2019/009351 filed Jul. 26, 2019, which claims priority to Korean Patent Application No. 10-2018-0087971 filed on Jul. 27, 2018, the disclosures of which are incorporated herein by reference.

TECHNICAL FIELD

The present disclosure relates to a battery module and a battery pack including the battery module.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attention as a new energy source for its environmental friendliness and energy efficiency, in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery pack by using at least one battery module and adding other components.

In the conventional battery module, it is important to solve the performance degradation caused by heat generated during charging and discharging. The heat generation of the battery module is greatest at electrode leads of the battery cells, which is one of the smallest unit areas, while the battery module is being charged and discharged, since the resistance is high at the electrode leads. The heat generation directly leads to damage of the battery cells.

Thus, it is required to find a more effective way to control the heat generation at the electrode leads of the battery cells in the battery module when the battery module is cooled.

DISCLOSURE

Technical Problem

The present disclosure is directed to providing a battery module, which may effectively suppress a temperature rise caused by heat generation at electrode leads of battery cells, and a battery pack including the battery module.

Technical Solution

In one aspect of the present disclosure, there is provided a battery module, comprising: a plurality of battery cells stacked on each other; a module case configured to accommodate the plurality of battery cells; a thermal resin filled in the module case to cover at least a portion of electrode leads of the plurality of battery cells; and at least one resin injection hole formed at one side of the module case to fill the thermal resin.

The battery module may further comprise a heatsink mounted to one side of the module case to cool the plurality of battery cells, the heatsink disposed to face the thermal resin with the module case being interposed therebetween.

A plurality of the resin injection holes may be provided at a center of one side of the module case, and the plurality of resin injection holes may be provided at higher locations than the electrode leads of the plurality of battery cells.

The module case may have a resin filling channel configured to connect the at least one resin injection hole and the electrode leads of the plurality of battery cells.

The battery module may further comprise at least one filling check hole formed at one side of the module case and disposed in alignment with the electrode leads of the plurality of battery cells.

A plurality of the filling check holes may be provided, and the plurality of filling check holes may be disposed to face each other with the at least one resin injection hole being interposed therebetween.

The battery module may further comprise an injection plate provided to an inner wall at the other side of the module case and having at least one support stopper formed to protrude thereon.

The at least one support stopper may protrude by a predetermined length toward the electrode leads of the plurality of battery cells and be brought into contact with the thermal resin.

The injection plate may be made of a transparent material.

The battery module may further comprise at least one filling check hole formed at the other side of the module case and disposed in alignment with the electrode leads of the plurality of battery cells and the support stopper.

The at least one support stopper may have an inner hollow formed with a predetermined length so that the thermal resin is filled therein.

The inner hollow may be disposed in alignment with the at least one filling check hole.

The inner hollow may have a leveling line formed to check a filling height of the thermal resin.

In another aspect of the present disclosure, there is also provided a battery module, comprising: a plurality of battery cells stacked on each other; a heatsink configured to cool the plurality of battery cells; a module case having one side to which the heatsink is mounted, the module case being configured to accommodate the plurality of battery cells; and a thermal resin disposed inside the module case to face the heatsink, the thermal resin being filled in the module case to cover at least a portion of electrode leads of the plurality of battery cells.

In another aspect of the present disclosure, there is also provided a battery pack, comprising: at least one battery module according to the above embodiments; and a pack case configured to package the at least one battery module.

Advantageous Effects

According to various embodiments as above, it is possible to provide a battery module, which may effectively suppress a temperature rise caused by heat generation at electrode leads of battery cells, and a battery pack including the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawings.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease of understanding the present disclosure, the accompanying drawings are not drawn to real scale, but the dimensions of some components may be exaggerated.

Figure 1:
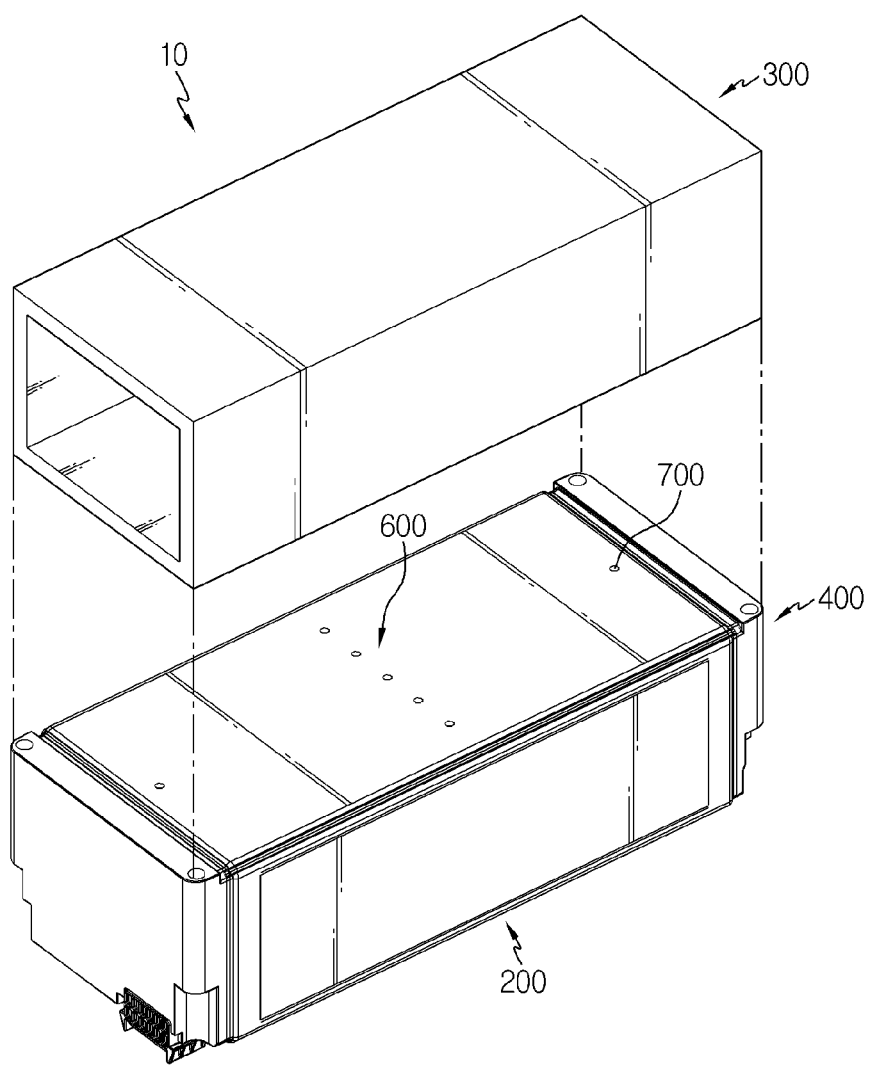
FIG. 1 is a diagrammatic exploded view illustrating a battery module according to an embodiment of the present disclosure.
Figure 2:
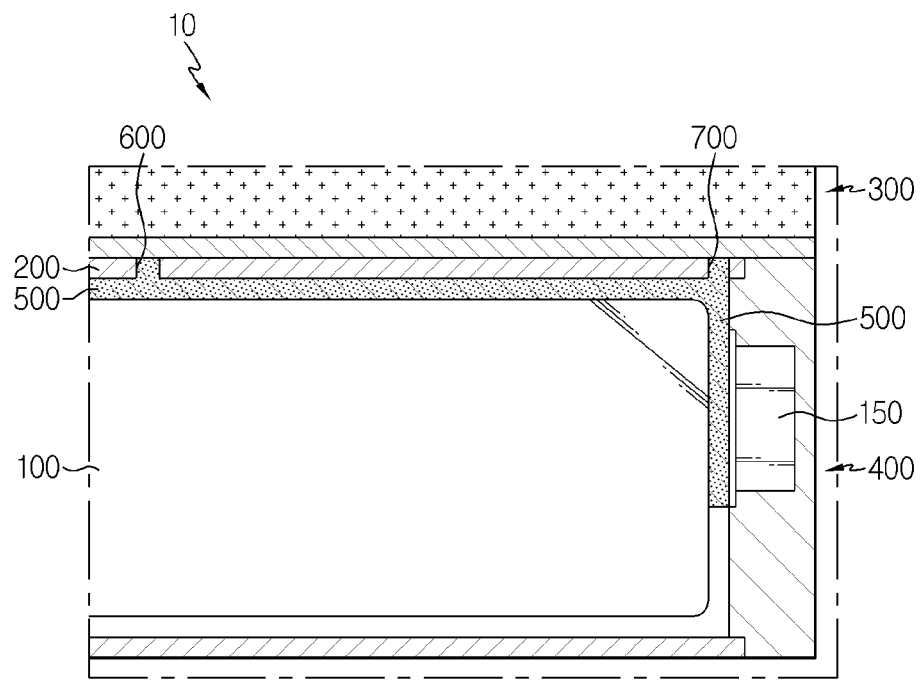
FIG. 2 is a cross-sectional view showing a main part of the battery module of FIG. 1.
Figure 3:
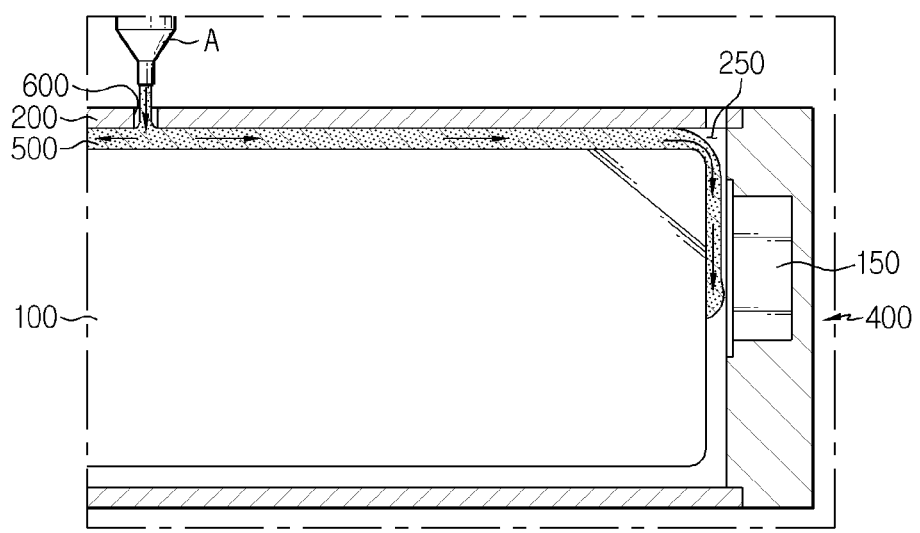
FIGS. 3 and 4 are diagrammatic sectional views illustrating a process of injecting a thermal resin into the battery module of FIG. 1.
Figure 4:
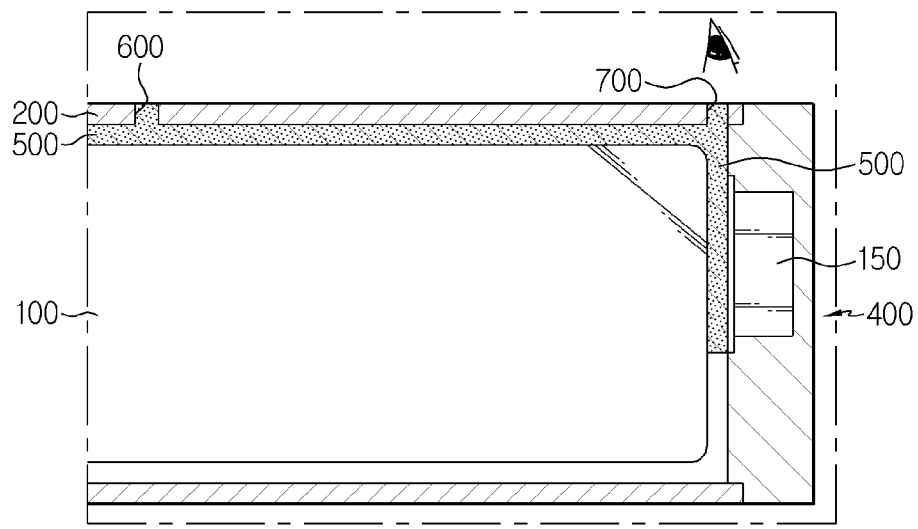

FIG. 1 is a diagrammatic exploded view illustrating a battery module according to an embodiment of the present disclosure, FIG. 2 is a cross-sectional view showing a main part of the battery module of FIG. 1, and FIGS. 3 and 4 are diagrammatic sectional views illustrating a process of injecting a thermal resin into the battery module of FIG. 1.

Referring to FIGS. 1 to 4, a battery module 10 may include a battery cell 100, a module case 200, a heatsink 300, a bus bar assembly 400, a thermal resin 500, a resin injection hole 600, and a filling check hole 700.

The battery cell 100 is a secondary battery, which may be a pouch-type secondary battery, a rectangular secondary battery or a cylindrical secondary battery. Hereinafter, in this embodiment, the battery cell 100 is described as being a pouch-type secondary battery.

A plurality of the battery cells 100 may be provided. The plurality of battery cells 100 may be stacked to be electrically connected to each other. The electrical connection between the plurality of battery cells 100 may be implemented through the electrical connection between electrode leads 150 of the plurality of battery cells 100 and the bus bar assembly 400, explained later.

The module case 200 may accommodate the plurality of battery cells 100. To this end, the module case 200 may have an accommodation space for accommodating the plurality of battery cells 100. In addition, the module case 200 may accommodate components such as various electrical components of the battery module 10.

The heatsink 300 for cooling the battery cells 100 of the battery module 10 may be mounted to one side of the module case 200, specifically an upper side of the module case 200.

The module case 200 may have a resin filling channel 250.

The resin filling channel 250 may be provided in the module case 200 to form a predetermined space for connecting at least one resin injection hole 600, explained later, and the electrode leads 150 of the plurality of battery cells 100.

The heatsink 300 is for cooling the plurality of battery cells 100 and may be mounted to the upper side of the module case 200. The heatsink 300 may be disposed to face the thermal resin 500, explained later with the module case 200 being interposed therebetween.

The heatsink 300 may be provided in an air-cooled or water-cooled structure. Hereinafter, in this embodiment, the heatsink 300 is described as being provided in a water-cooled structure in which a cooling water flows.

The bus bar assembly 400 may be electrically connected to the electrode leads 150 of the battery cells 100. The bus bar assembly 400 may cover both sides of the module case 200.

The thermal resin 500 is disposed to face the heatsink 300 inside the module case 200 and may be filled in the module case 200 to cover at least a portion of the electrode leads 150 of the plurality of battery cells 100.

The thermal resin 500 may be made of a material with high thermal conductivity and insulating properties. The thermal resin 500 may guide the battery cells 100 to be cooled and also guide the battery cells 100 to be stably fixed inside the module case 200.

The resin injection hole 600 is formed at one side of the module case 200, specifically at the upper side of the module case 200, and may be provided as a hole having a predetermined size for filling the thermal resin 500.

A plurality of the resin injection holes 600 may be provided.

The plurality of resin injection holes 600 may be disposed at a center of one side of the module case 200, specifically at a center of the upper side of the module case 200, to be spaced apart from each other by a predetermined distance.

Here, the plurality of resin injection holes 600 may be provided at higher locations than the electrode leads 150 of the plurality of battery cells 100. Accordingly, when the thermal resin 500 is injected using a resin injection device A, the thermal resin 500 may be naturally injected toward the electrode leads 150 due to its own weight, thereby improving the injection efficiency.

The filling check hole 700 is formed at one side of the module case 200, specifically at the upper side of the module case 200, and may be provided towards an edge of the upper side of the module case 200, which is spaced apart from the plurality of resin injection holes 600.

The filling check hole 700 may be disposed in alignment with the electrode leads 150 of the plurality of battery cells 100 in the height direction of the module case 200 so as to easily check whether the thermal resin 500 is filled up to the electrode leads 150 of the plurality of battery cells 100.

When the thermal resin 500 is injected through the filling check hole 700, a manufacturer or the like may check whether the thermal resin 500 is properly filled up to the electrode leads 150 of the battery cells 100.

Specifically, while the thermal resin 500 is being continuously injected, the thermal resin 500 may be filled to partially cover the electrode leads 150 of the battery cells 100.

After that, if the thermal resin 500 is injected further, the thermal resin 500 may be introduced toward the filling check hole 700 disposed in alignment with the electrode leads 150 of the battery cells 100.

The manufacturer or the like may confirm whether the thermal resin 500 is filled up to the electrode leads 150 of the battery cells 100 and whether the thermal resin 500 is fully filled inside the module case 200 by checking whether the thermal resin 500 flows toward the filling check hole 700.

If the thermal resin 500 overflows out of the filling check hole 700, the manufacturer or the like may stop the injection of the thermal resin 500 using the resin injection device A and complete the process of injecting the thermal resin 500.

If the process of injecting the thermal resin 500 is completed, the heatsink 300 may be mounted to the upper side of the module case 200 at which the filling check hole 700 and the resin injection hole 600 are provided.

Figure 5:
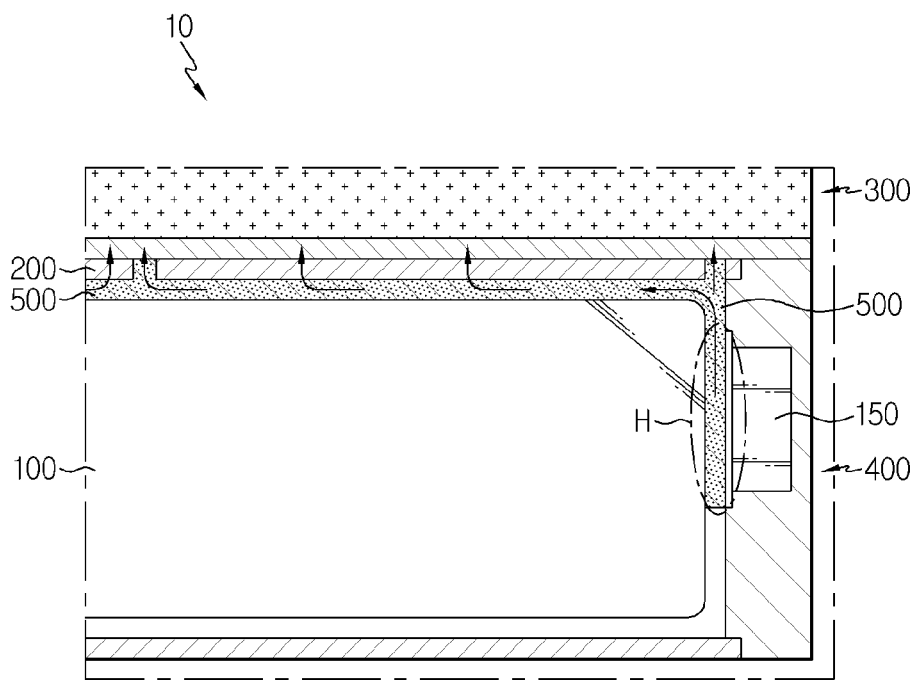
FIG. 5 is a diagrammatic sectional view illustrating a cooling mechanism of the battery module of FIG. 1.

FIG. 5 is a diagrammatic sectional view illustrating a cooling mechanism of the battery module of FIG. 1.

Referring to FIG. 5, when the battery module 10 generates heat, the highest heat H may be generated at the electrode leads 150 of the battery cells 100. This is because the cross-sectional area of the electrode leads 150 of the battery cells 100 is relatively smaller than that of other components of the battery module 10 and thus the resistance is highest against the current flow during the charging and discharging.

In this embodiment, since the thermal resin 500 is filled in the heating portion H of the electrode leads 150 of the battery cells 100, the heat of the heating portion H of the electrode leads 150 may be effectively transferred toward the heatsink 300.

Specifically, the heat of the heating portion H of the electrode lead 150 is transferred to the upper side of the module case 200 via the thermal resin 500 and then immediately transferred to the heatsink 300 disposed at the upper side of the module case 200. Thus, it is possible to effectively suppress the temperature rise caused by the heat of the electrode lead 150 where the greatest heat is generated inside the module case 200 of the battery module 10.

As described above, in this embodiment, by means of the thermal resin 500 that covers at least a portion of the electrode leads 150 of the battery cells 100, it is possible to minimize the damage caused by the temperature rise of the battery cells 100 and thus extend the life of the battery cells 100. Also, it is possible to effectively prevent the battery cells 100 from being degraded due to the generated heat.

Moreover, in this embodiment, since the thermal resin 500 is injected and filled to cover the electrode leads 150 of the battery cells 100, the assembling process may be performed simpler than a structure where a thermal conductive member such as a completed accessory for partially cooling the electrode lead 150 is separately added inside the module case 200.

Specifically, if a separate thermal conductive member having a predetermined shape that is completed in advance is added to partially cool the electrode lead 150, the thermal conductive member may interfere with other electrical components or the battery cells 100 inside the module case 200 during the assembling process, which may increase the risk of damage to the components or the battery cells 100. In addition, the possibility of erroneous assembly may be increased due to the assembly tolerance when the separate thermal conductive member is assembled inside the module case.

However, in this embodiment, the electrode leads 150 of the battery cells 100 are covered by filling the thermal resin 500, other electrical components or the battery cells 100 inside the module case 100 are not damaged, different from the case where a separate thermal conductive member is additionally assembled. In addition, erroneous assembly caused by assembly tolerances may be prevented fundamentally.

Figure 6:
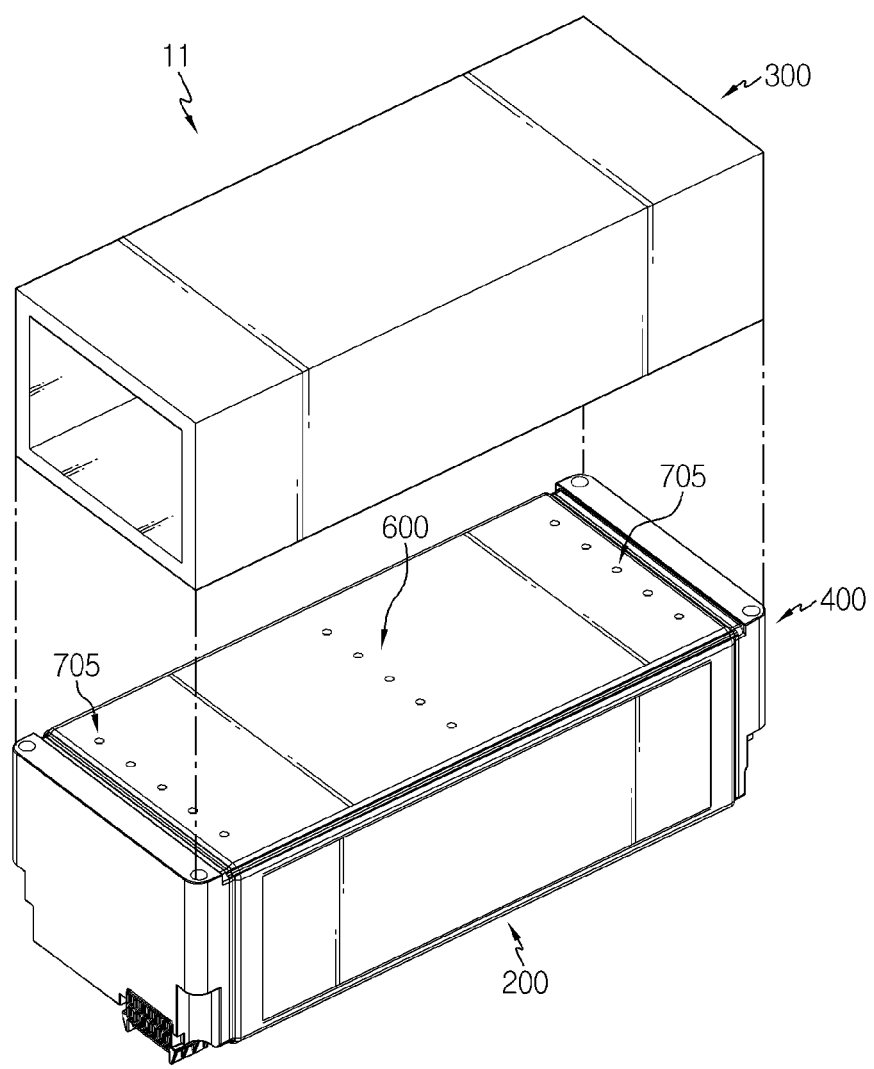
FIG. 6 is a diagrammatic exploded view illustrating a battery module according to another embodiment of the present disclosure.

FIG. 6 is a diagrammatic exploded view illustrating a battery module according to another embodiment of the present disclosure.

Since the battery module 11 according to this embodiment is similar to the battery module 10 of the former embodiment, hereinafter, the repeated description of a feature identical or similar to that of the former embodiment will be omitted, and the description will be mainly given based on differences from the former embodiment.

Referring to FIG. 6, a battery module 11 may include a battery cell 100 (see FIG. 2), a module case 200, a heatsink 300, a bus bar assembly 400, a thermal resin 500 (see FIG. 2), a resin injection hole 600, and a filling check hole 705.

The battery cell 100 (see FIG. 2), the module case 200, the heatsink 300, the bus bar assembly 400, the thermal resin 500 (see FIG. 2) and the resin injection hole 600 are substantially identical or similar to those of the former embodiment, and thus their repeated descriptions will be omitted.

A plurality of the filling check holes 705 may be provided.

The plurality of filling check holes 705 may be spaced apart from each other along the width direction of the module case 200 and may be disposed to face each other with the plurality of resin injection holes 600 being interposed therebetween.

In this embodiment, since a plurality of the filling check holes 705 are provided along the width direction of the module case 200, when the thermal resin 500 is injected, it is possible to more homogeneously check whether the thermal resin 500 is evenly filled in the module case 200 and whether the thermal resin 500 is fully filled and applied to the electrode lead 150 of each battery cell 100.

Figure 7:
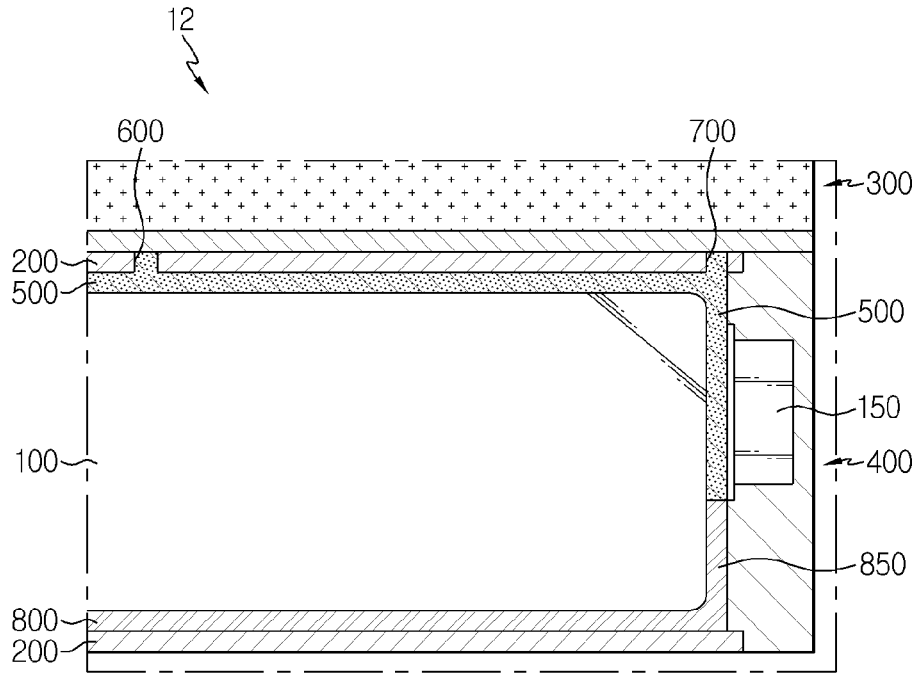
FIG. 7 is a diagrammatic sectional view illustrating a battery module according to still another embodiment of the present disclosure.

FIG. 7 is a diagrammatic sectional view illustrating a battery module according to still another embodiment of the present disclosure.

Since the battery module 12 according to this embodiment is similar to the battery module 10, 11 of the former embodiments, hereinafter, the repeated description of a feature identical or similar to that of the former embodiments will be omitted, and the description will be mainly given based on differences from the former embodiments.

Referring to FIG. 7, a battery module 12 may include a battery cell 100, a module case 200, a heatsink 300, a bus bar assembly 400, a thermal resin 500, a resin injection hole 600, a filling check hole 700, and an injection plate 800.

The battery cell 100, the module case 200, the heatsink 300, the bus bar assembly 400, the thermal resin 500, the resin injection hole 600 and the filling check hole 700 are substantially identical or similar to those of the former embodiments, and thus their repeated descriptions will be omitted.

The injection plate 800 may be provided to an inner wall at the other side of the module case 200, specifically, an inner wall at a lower side of the module case 200. The injection plate 800 may be provided by plastic injection molding and may guide the battery cells 100 to be more stably fixed inside the module case 200.

At least one support stopper 850 may be formed on the injection plate 800.

The at least one support stopper 850 may protrude by a predetermined length toward the electrode leads 150 of the plurality of battery cells 100. An end of the at least one support stopper 850 may be brought into contact with the thermal resin 500 and may stably support the electrode leads 150 of the battery cells 100 inside the module case 200 together with the thermal resin 500.

Figure 8:
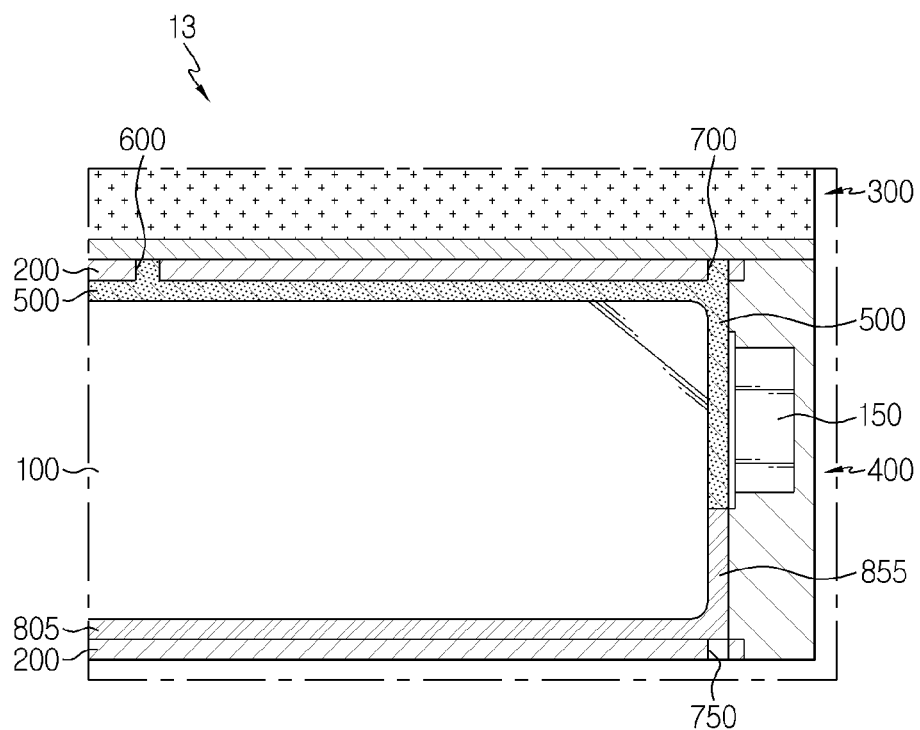
FIG. 8 is a diagrammatic sectional view illustrating a battery module according to still another embodiment of the present disclosure.

FIG. 8 is a diagrammatic sectional view illustrating a battery module according to still another embodiment of the present disclosure.

Since the battery module 13 according to this embodiment is similar to the battery module 10, 11, 12 of the former embodiments, hereinafter, the repeated description of a feature identical or similar to that of the former embodiments will be omitted, and the description will be mainly given based on differences from the former embodiments.

Referring to FIG. 8, a battery module 13 may include a battery cell 100, a module case 200, a heatsink 300, a bus bar assembly 400, a thermal resin 500, a resin injection hole 600, filling check holes 700, 750 and an injection plate 805.

The battery cell 100, the module case 200, the heatsink 300, the bus bar assembly 400, the thermal resin 500 and the resin injection hole 600 are substantially identical or similar to those of the former embodiments, and thus their repeated descriptions will be omitted.

The filling check holes 700, 750 may be provided to the upper side and the lower side of the module case 200, respectively. Specifically, the filling check hole 700 may be provided to the upper side of the module case 200. In addition, the filling check hole 750 is formed at the other side of the module case 200, specifically at the lower side of the module case 200, and is disposed to face the filling check hole 700. Also, the filling check hole 750 may be disposed in alignment with the electrode leads 150 of the plurality of battery cells 100 and a support stopper 855, explained later, of the injection plate 805 in the height direction of the module case 200.

The injection plate 805 may include the support stopper 855, similar to the former embodiment, and may be made of a transparent material. Accordingly, in this embodiment, since the injection plate 805 is made of a transparent material, it is possible to check with naked eyes through the filling check hole 750 provided at the lower side of the module case 200 whether the thermal resin 500 is filled up to the electrode lead 150.

Accordingly, in this embodiment, when the thermal resin 500 is injected, it is possible to more accurately determine whether the thermal resin 500 is filled up to the electrode leads 150 of the battery cells 100.

Figure 9:
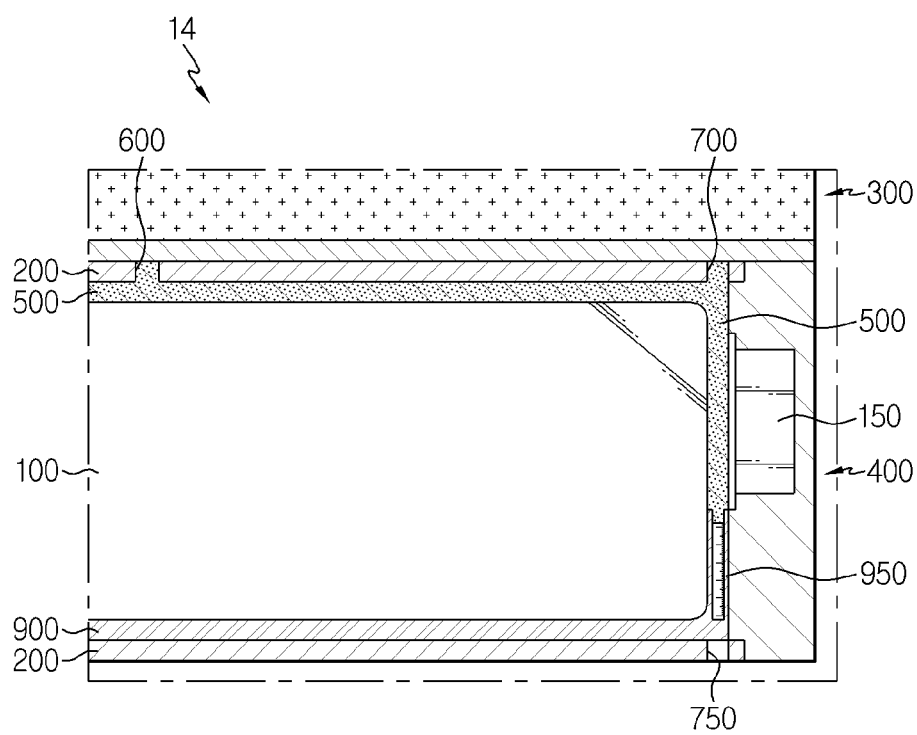
FIG. 9 is a diagrammatic sectional view illustrating a battery module according to still another embodiment of the present disclosure.
Figure 10:
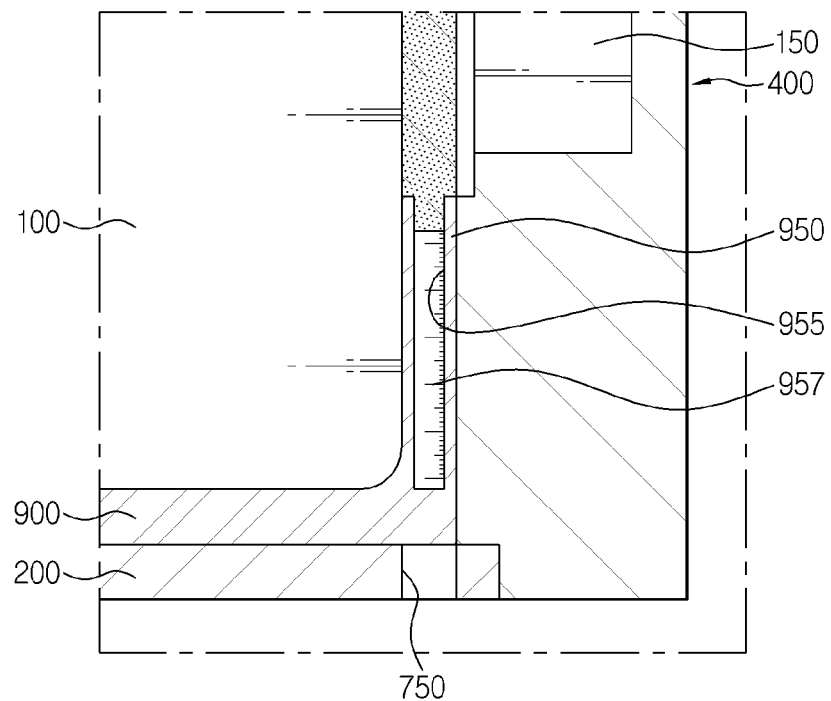
FIG. 10 is an enlarged view showing a main part of FIG. 9.

FIG. 9 is a diagrammatic sectional view illustrating a battery module according to still another embodiment of the present disclosure, and FIG. 10 is an enlarged view showing a main part of FIG. 9.

Since the battery module 14 according to this embodiment is similar to the battery module 10, 11, 12, 13 of the former embodiments, hereinafter, the repeated description of a feature identical or similar to that of the former embodiments will be omitted, and the description will be mainly given based on differences from the former embodiments.

Referring to FIGS. 9 and 10, a battery module 14 may include a battery cell 100, a module case 200, a heatsink 300, a bus bar assembly 400, a thermal resin 500, a resin injection hole 600, filling check holes 700, 750 and an injection plate 900.

The battery cell 100, the module case 200, the heatsink 300, the bus bar assembly 400, the thermal resin 500, the resin injection hole 600 and the filling check holes 700, 750 are substantially identical or similar to those of the former embodiments, and thus their repeated descriptions will be omitted.

The injection plate 900 may be made of a transparent material, similar to the former embodiment, and may include at least one support stopper 950.

The at least one support stopper 950 may have an inner hollow 955.

The inner hollow 955 is formed to have a predetermined length along the longitudinal direction of the support stopper 950 and may form a predetermined space in which the thermal resin 500 may be filled. The inner hollow 955 may be disposed on the same line as the filling check holes 700, 750, specifically as the filling check hole 750 provided at the lower side of the module case 200. Accordingly, the manufacturer or the like may more easily identify the inner hollow 955 through the filling check hole 750.

A leveling line 957 may be formed at the inner hollow 955.

The leveling line 957 is for checking a filling height of the thermal resin 500 and may be formed at predetermined intervals along the height direction of the inner hollow 955.

In this embodiment, by means of the inner hollow 955 of the at least one support stopper 950 and the leveling line 957 provided to the inner hollow 955, when the thermal resin 500 is filled, it is possible to more accurately figure out the filling amount of the thermal resin 500. Accordingly, in this embodiment, it is possible to more accurately control the filling of the thermal resin 500, when the thermal resin 500 is injected.

Figure 11:
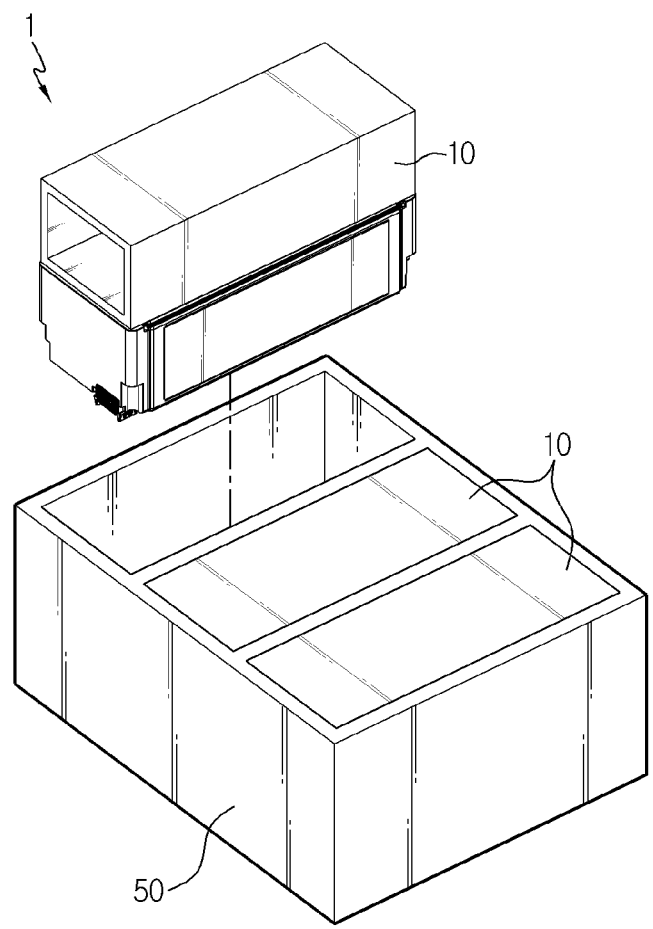
FIG. 11 is a diagrammatic partially exploded view illustrating a battery pack according to an embodiment of the present disclosure.
Figure 12:
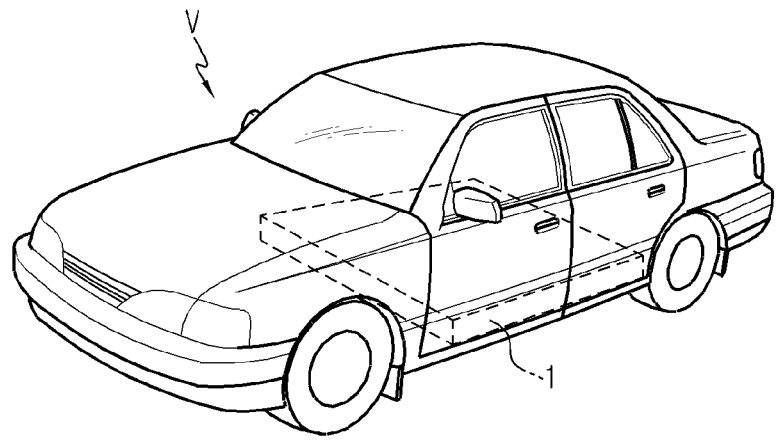
FIG. 12 is a diagram illustrating a vehicle according to an embodiment of the present disclosure.

FIG. 11 is a diagrammatic partially exploded view illustrating a battery pack according to an embodiment of the present disclosure, and FIG. 12 is a diagram illustrating a vehicle according to an embodiment of the present disclosure.

Referring to FIGS. 11 and 12, a battery pack 1 may include at least one battery module 10 according to the former embodiments and a pack case 50 for packaging the at least one battery module 10.

The at least one battery module 10 may be provided as at least one of the battery modules 11, 12, 13, 14 of the former embodiments, and a plurality of the battery modules may also be provided. If a plurality of the battery modules 11, 12, 13, 14 are provided, the battery module 10 of the former embodiment and the battery modules 11, 12, 13, 14 may also be provided as a group.

The battery pack 1 may be provided to a vehicle V as a fuel source of the vehicle V. As an example, the battery pack 1 may be provided to an electric vehicle, a hybrid vehicle, and various other-type vehicles capable of using the battery pack 1 as a fuel source.

In addition, the battery pack 1 may be provided in other devices, instruments or facilities such as an energy storage system using a secondary battery, in addition to the vehicle V.

As described above, the battery pack 1 of this embodiment and devices, instruments or facilities such as the vehicle V, which have the battery pack 1, include the battery module 10, 11, 12, 13, 14 as described above, and thus it is possible to implement a battery pack 1 having all the advantages of the battery module 10, 11, 12, 13, 14 described above, or devices, instruments, facilities or the like such as the vehicle V, which have the battery pack 1.

According to various embodiments as above, it is possible to provide the battery module 10, 11, 12, 13, 14 capable of effectively suppressing a temperature rise caused by heating of the electrode leads 150 of the battery cells 100, the battery pack 1 including the battery module 10, 11, 12, 13, 14, and the vehicle V including the battery pack 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
   a plurality of battery cells stacked on each other along a stacking direction to define a battery cell stack, each of the plurality of battery cells having a respective electrode lead projecting therefrom along an extension direction oriented orthogonally to the stacking direction;
   a module case configured to accommodate the plurality of battery cells;
   a thermal resin partially filling the module case so as to define a thermal resin shape, the thermal resin shape having a first planar region parallel to both the stacking direction and the extension direction and covering a first side of the battery cell stack, and the thermal resin shape having a first projecting portion extending from the first planar region along a height direction orthogonal to both the stacking direction and the extension direction, the first projecting portion extending to cover at least a portion of electrode leads of the plurality of battery cells;
   at least one resin injection hole formed in a first side of the module case along the first side of the battery cell stack, the at least one resin injection hole being configured to allow the thermal resin to be filled into the module case; and
   an injection plate positioned within the module case, the injection plate having a second planar region parallel to the first planar region of the thermal resin and extending along a second side of the battery cell stack, the second side of the battery cell stack being opposite to the first side of the battery cell stack in the height direction, and the injection plate having a second projecting portion extending from the second planar region along the height direction, the second projecting portion extending to contact the first projecting portion of the thermal resin.

2. The battery module according to claim 1, further comprising:
   a heatsink mounted along the first side of the module case to cool the plurality of battery cells, the heatsink extending alongside the first planar region of the thermal resin with the module case being interposed therebetween.

3. The battery module according to claim 2,
   wherein a plurality of the resin injection holes are provided at a center of the first side of the module case, and
   wherein the plurality of resin injection holes are provided at locations higher than the electrode leads of the plurality of battery cells in the height direction.

4. The battery module according to claim 2,
   wherein the module case has a resin filling channel configured to connect the at least one resin injection hole and the electrode leads of the plurality of battery cells.

5. The battery module according to claim 2, further comprising:
   at least one filling check hole formed on the first side of the module case and disposed in alignment with the electrode leads of the plurality of battery cells.

6. The battery module according to claim 5,
   wherein a plurality of the filling check holes are provided, and
   wherein the plurality of filling check holes are disposed at opposing sides of the at least one resin injection hole in the extension direction.

7. The battery module according to claim 1,
   wherein the injection plate is made of a transparent material.

8. The battery module according to claim 7, further comprising:
   at least one filling check hole formed in a second side of the module case along the second side of the battery cell stack, the at least one filling check hole being disposed in alignment with the electrode leads of the plurality of battery cells and in alignment with the second projecting portion of the injection plate.

9. The battery module according to claim 8,
   wherein the second projecting portion of the injection plate has an inner hollow formed with a predetermined length along the height direction so that the thermal resin is filled therein.

10. The battery module according to claim 9,
    wherein the inner hollow is disposed in alignment with the at least one filling check hole.

11. The battery module according to claim 10,
    wherein the inner hollow has a leveling line formed to check a filling height of the thermal resin in the height direction.

12. A battery pack, comprising:
    at least one battery module defined in claim 1; and
    a pack case configured to receive the at least one battery module.

13. A battery module, comprising:
    a plurality of battery cells stacked on each other;
    a module case configured to accommodate the plurality of battery cells;
    a thermal resin filled in the module case and extending to cover at least a portion of electrode leads of the plurality of battery cells;

at least one resin injection hole formed at a first side of the module case and configured to allow the thermal resin to be filled into the module case; and an injection plate provided along an inner wall at a second side of the module case opposed to the first side, the injection plate having at least one support stopper formed to protrude therefrom, wherein the injection plate is made of a transparent material, the transparent material permitting a user to see with naked eyes whether the thermal resin filled into the module case via the at least one resin injection hole is filled up to the electrode leads of the plurality of battery cells.

14. The battery module according to claim 13, further comprising:

at least one filling check hole formed at the second side of the module case and disposed in alignment with the electrode leads of the plurality of battery cells and the support stopper.

15. The battery module according to claim 14, wherein the at least one support stopper has an inner hollow formed with a predetermined length so that the thermal resin is filled therein.

16. The battery module according to claim 15, wherein the inner hollow is disposed in alignment with the at least one filling check hole.

17. The battery module according to claim 16, wherein the inner hollow has a leveling line formed to check a filling height of the thermal resin.

* * * * *